April 29, 1952
J. C. CLINEFELTER
2,595,210
MACHINE FOR FEEDING, WORKING, AND
MIXING PLASTIC MATERIAL
Filed June 11, 1949
2 SHEETS—SHEET 1
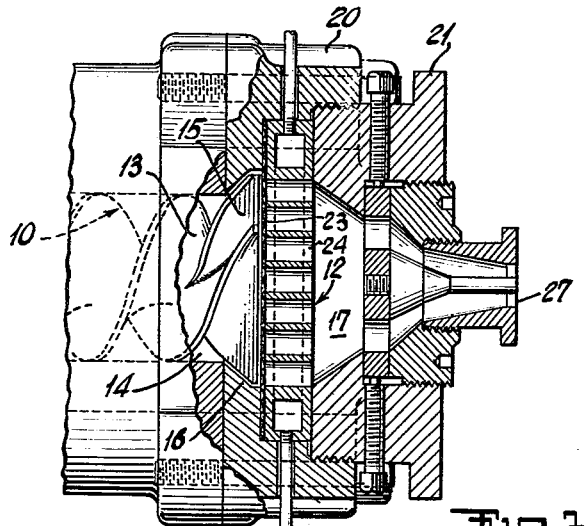
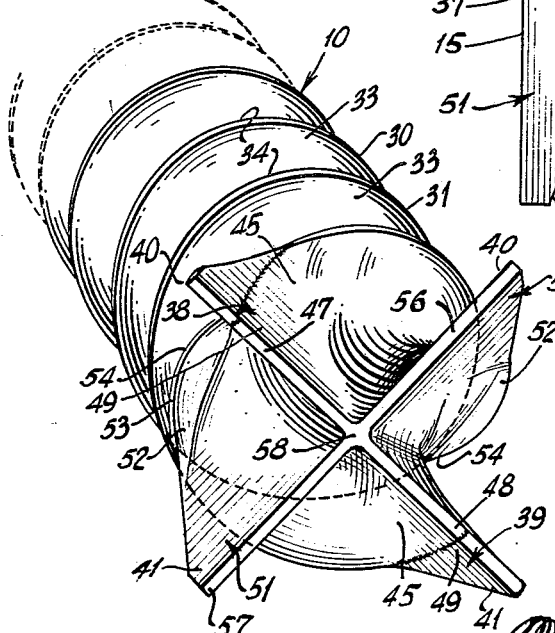
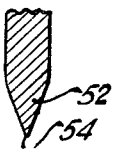
INVENTOR
JAMES C. CLINEFELTER.
BY
ATTORNEYS

INVENTOR
JAMES C. CLINEFELTER.
BY
ATTORNEYS

Patented Apr. 29, 1952

2,595,210

UNITED STATES PATENT OFFICE 2,595,210

MACHINE FOR FEEDING, WORKING, AND MIXING PLASTIC MATERIAL

James C. Clinefelter, Akron, Ohio

Application June 11, 1949, Serial No. 98,612

12 Claims. (Cl. 18—2)

The present invention relates to machines for feeding, working and mixing plastic material, such as rubber, and although it has many uses, it is particularly adaptable for use in connection with extruding machines of the general character described in my prior Patent No. 2,291,212.

In the aforesaid patent, there is described an extruding machine having a feed screw, a forming die, and a perforated partition device between said feed screw and said die extending transversely to the axis of the screw. Detachably secured to the end of the feed screw by fastening elements is an impeller terminating in two wiper blades laterally offset from each other, and interconnected by an intermediate central blade. These blades are disposed in close cutting proximity to the perforated partition device.

As the plastic material passes through the impeller, it is forced thereby through the perforated partition device and then cut off by the rotating blades. This operation forms a multitude of comparatively small bits of the plastic material which merge on the delivery side of the perforated partition into a conglomerate mass. The material is thereby physically plasticized and thoroughly mixed.

The aforesaid patent also discloses a construction, in which the chamber enclosing the impeller flares towards the perforated partition device and the impeller is correspondingly tapered. This permits a larger partition area and also longer impeller blades, so that for any given screw speed, a larger quantity of material can be forced through the partition device. This reduces the back pressure on the feed screw and results in less generated heat and greater machine capacity.

It is advantageous for the impeller to be integral with the feed screw, since such an arrangement eliminates the space between the rear end of the impeller and the forward end of the feed screw. This space may break up the continuity of the feed surface between the feed screw and the impeller, and may cause thereby uncontrolled agitation of the plastic material in the field of operation of said impeller. The integral feed screw and impeller unit has the added advantage of affording structural rigidity, better control and increased production due to elimination of the back surface obstruction of the bolted or screwed-on type of impeller. The integral feed screw and impeller unit also obviates the possibility of the impeller becoming loose from the feed screw and thereby breaking at its tips.

The making of the impeller integral with the feed screw poses many problems. For example, if the feed screw is merely extended to form integrally therewith the impeller, then the thread of said screw will terminate in a substantially irregular wiping edge extending non-radially toward the axial boss or hub of the screw and progressively increasing in width radially inwardly, so that at its center it will have a width corresponding to the diameter of said hub or boss. A non-radial rotating edge of this character is obviously not as effective for cutting as a radial edge of uniform width. Moreover, the full-sized end of the boss or hub opposite the perforated partition device constitutes a non-working or dead portion of the impeller, reducing the capacity of the machine. Furthermore, the mere extension of the feed screw of cylindrical stock to define the impeller, cannot produce an impeller with flaring blade tips. Also, such feed screw extension will produce only as many cutting edges as there are threads, thereby limiting the extent of cutting action for any given impeller speed.

One object of the present invention is to provide integral with a feed screw a new and improved cutting impeller for the general purpose described, which is designed to provide better performance control and increased production and to withstand greater rigorous service stresses in comparison with the bolted or screwed-on type of impeller.

In carrying out certain features of the present invention, the impeller is made integral with the feed screw and is ground, profiled and otherwise finished to provide the necessary material advancing surface and material cutting or wiping edges. The operating surfaces of the impeller constitute helical continuations of the feed screw thread surfaces. The hub or root boss of the impeller at its inner end is a continuation of the hub or boss of the feed screw. However, the threads or blades on the impeller are progressively increased in depth towards the outer end of the impeller to bevel the hub or boss of said impeller towards a diametrical edge at said end. At the same time, the forward surfaces of the impeller blades are graded to terminate into radial outer cutting ends or edges in continuous aligned relationship with the diametrical hub edge above described. The resulting impeller structure will have cutting edges at its outer or delivery end radiating from a center of minimum cross-sectional area. Dead or inactive areas in the center of the outer end of the impeller are thereby eliminated or reduced to a minimum.

At their delivery ends, the operating surfaces of the impeller blades are turned axially outwardly, so that the sides of said blades flanking the cutting edges extend substantially at right angles to the plane of said cutting edges. This construction is conducive to effective shearing action by the impeller blades.

The impeller blades are flared towards their outer ends to cooperate with an enlarged perforated partition device, for the purpose already made apparent.

If the feed screw has double threads, then the impeller may have double blades arranged 180° apart and merging into said threads respectively. The resulting impeller will have only two radial cutting edges, 180° apart. As a further feature of the present invention, the impeller, in certain forms of the invention, may have more blades than threads on the feed screw, to increase the cutting action for any given speed of the feed screw. For that purpose, the impeller has additional blades similar to the basic blades and arranged so that all of the blades are equally spaced. The basic blades merge into the threads respectively of the feed screw, while the additional blades are welded to the hub or boss of the feed screw and at their inner sections form partial threads of said feed screw spaced equally from the full threads of said feed screw.

The material is advanced by the feed screw into as many helical streams as there are full threads. When each of these streams reaches the field of action of the impeller, it is equally subdivided by each additional blade of the impeller and advanced through the perforated partition device. This multiple blade operation effects better dispersion of the material.

Various other objects, features and advantages of the invention are apparent from the following particular description and from an inspection of the accompanying drawings, in which Fig. 1 is a side elevation partly in section of a portion of an extruding machine equipped with a form of feed screw and a four blade impeller unit embodying the present invention;

Fig. 2 is a perspective of the feed screw impeller unit shown in Fig. 1 but on a larger scale;

Fig. 3 is a side elevation of the feed screw impeller unit shown in Fig. 2;

Fig. 4 is a section of the added impeller blade taken on lines 4—4 of Fig. 3;

Figure 5:
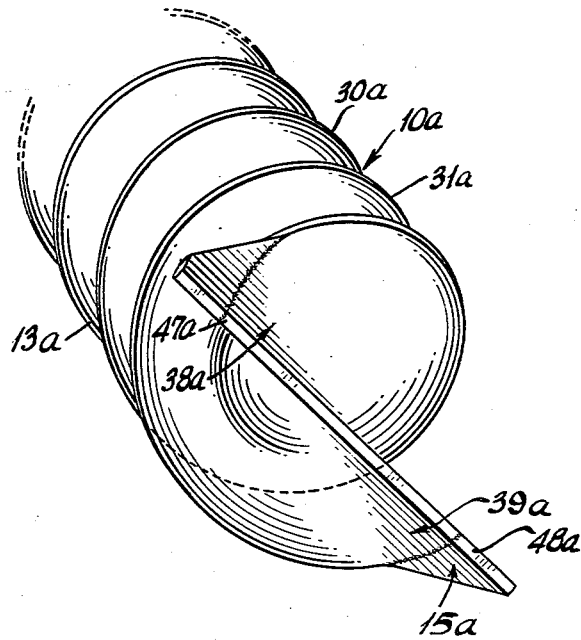
Fig. 5 is a perspective of another form of feed screw impeller unit embodying the present invention.

Referring to Fig. 1 of the drawing, there is shown a general type of extruding machine, in which the feed screw impeller unit of the present invention is particularly useful. This extruding machine has a feed device 10 adapted to advance the plastic material, such as rubber, either in crude form or in partially prepared form, from a feed station (not shown), through a perforated partition device 12. This feed device 10 comprises a feed screw 13 in a cylindrical chamber 14, and a tapered impeller 15 integral with said screw and located in a flaring bore 16. This impeller 15 is designed to push the material from the feed screw 13, through the perforated partition device 12 and into a delivery chamber 17 in the form of streams or rods, and to cut these streams to form a multitude of comparatively small bits or increments which merge in said delivery chamber into a conglomerate mass.

The perforated partition device 12 is clamped in position between sections 20 and 21 of the machine housing, as shown, and comprises a circular screen 23 desirably of wire woven construction and a flat circular perforated backing plate 24.

The impeller 15 with its cutting edges in close proximity to the rough or irregular surface of the screen 23 acts to shear off the material that has already passed through its perforations, thus severing it from the rest of the batch which continuously follows. As the impeller 15 continuously imparts a rotary motion to the mass in addition to a forward pushing movement, it will be seen that after every severance at a given perforation, the material next pushed through the screen 23 will be from a different portion of the batch. Since such action occurs continuously, thorough mixing of the different parts of the plastic mass will result.

The action of the impeller in conjunction with the perforated partition device 12 is to masticate and break down the stock worked on, so that it is physically plasticized and rendered more adaptable for compounding mixing and/or shaping.

The conglomerated thoroughly mixed material on the discharge side of the partition device 12 is then discharged by the pressure created, through a die 27 to impart the desired shape to the material.

Although the extrusion machine is described of the general character disclosed in the aforesaid patent in which final shaping is effected, it may also be of the general character disclosed in copending application Serial No. 84,221, filed March 29, 1949, which has become Patent 2,576,444, in which the material is merely prepared in one of the preliminary stages for compounding.

The feature of the present invention is in the feed device 10, shown in one of its embodiments in Figs. 1–4.

The feed screw 13 has two similar threads or flights 30 and 31 of the same pitch arranged 180° apart and extending around a substantially cylindrical root hub or boss 32 integral therewith. Each of these threads has the usual helical surface 33 on the pressure forward side for material advancing action, the usual helical surface 34 on the trailing side, and the usual helical land 35 adapted to lie in engagement or at least in close proximity to the cylindrical bounding surface of the machine chamber 14.

The impeller 15 is integral with the feed screw 13 and comprises a root hub or boss 37 having at its inner end a diameter equal to the diameter of the hub 32 of the feed screw 13. Formed around this hub 37 and spaced 180° apart are two main blades 38 and 39 having their forward pressure surfaces 45 graded to bevel said hub towards its outer delivery end and thereby to reduce the dead or inactive area of the impeller at said outer end to a minimum, and to define radial cutting edges of uniform comparatively narrow widths, as will be more fully described.

The two impeller blades 38 and 39 at their inner ends are co-extensive with the screw threads 30 and 31 respectively of the feed screw 13 and form helical continuations of said threads respectively. The tips 40 and 41 of the impeller blades 38 and 39 respectively flare outwardly to conform with the flare in the machine bore 16, and their bases in the circle of the screw thread or flight lands 35 are helically curved up to approximately the outer or delivery end of the impeller at a pitch substantially equal to that of said thread lands to constitute helical extensions thereof. However, the forward pressure surface 45 of each impeller blade 38 or 39 is graded as described, so that these blades at their outer or delivery ends terminate in a pair of opposed radial cutting edges 47 and 48, respectively, of uniform width. These cutting edges 47 and 48 extend in diametric alignment and include in the center the bevel edge of the impeller hub 37. Near the outer ends, in the forward sections 49, the blades 38 and 39 are desirably given sharper axial outward turns, in order that the sides of said blades flanking said edges extend substantially at right angles to the plane of said edges.

To afford additional cutting action and thereby reduce the lengths of the increments cut for a given screw speed, the impeller 15 is provided with a second pair of blades 50 and 51, similar in shape, inclination and grading to the impeller blades 38 and 39 and spaced midway between the main blades 38 and 39. These additional impeller blades 50 and 51, at their inner ends, have respective rearward sections 52 extending beyond their tapered tip portions 40 and 41 and provided with helical lands 53 which are in the circle of the thread lands 35 and which have a pitch substantially equal to that of said thread lands. These blade extensions 52 fit in the cylindrical chamber 14 of the machine and define partial threads for the feed screw.

The partial thread extensions 52 are spaced 90° from the full threads 30 and 31, and each has its crest edge 54 at its inner end beyond its helical land 53 inclined abruptly towards the root hub 32 of the screw 13 to merge with streamline curvature into the periphery of said hub and its root edge 55 curved to seat with conformity on said hub and the impeller hub 37 and welded to said hubs. This crest edge 54 is doubly bevelled to subdivide the stream from each full screw thread 30 or 31, smoothly and neatly as it moves into the field of action of the blade extensions 52.

The additional blades 50 and 51 are graded and inclined to terminate at their outer or delivery ends in a pair of opposed radial cutting edges 56 and 57 respectively of uniform width, extending in diametrical alignment at 90° from the cutting blade edges 47 and 48. The four similar cutting edges 47, 48, 56 and 57 of the impeller 15 will thereby radiate in quadrant relationship from a center area 58 just large enough to define a supporting intersecting structure for the blades 38, 39, 50 and 51 at their delivery ends. With the resulting reduction or elimination of dead area in the hub section of the impeller 15 at its delivery end, substantially the entire area of the perforated partition device 12 is active for the passage of the plastic material therethrough. This structure affords maximum of capacity and offers minimum of flow resistance.

In the manufacture of the feed device 10, a single length of cylindrical stock is desirably machined to form not only the feed screw 13 with its threads or flights 30 and 31 but also an end section constituting an axial extension of the feed screw. This end section will have two helical threads constituting extensions of the feed screw threads 30 and 31 and at its outer end plane will define, as in the ordinary case of a feed screw cut in a plane at right angles to its axis, a comparatively large central area where the hub terminates and opposite end areas where the extension threads terminate tapering approximately radially outwardly from said central hub area towards the helical lands of said extension threads. The hub of this end section and the forward surfaces of said extension threads are then milled away and graded to sweep said forward surfaces and hub with streamlined continuous advancing curvature towards a diametrical outer narrow edge. The center of this diametrical edge constitutes the outer verge of the end section of the hub bevelled by the milling operation described and the opposite ends of this edge constitute the radial edges of the extension threads which are now the partially finished impeller blades 38 and 39. The forward surfaces of the end section along this diametrical edge are then built up by weld deposit and ground, profiled and otherwise finished to afford the desired impeller blade shape and to provide the outwardly turned radial cutting edges 47 and 48, as described. Impeller sections 40 and 41 of substantially triangular shape are then welded to the helical lands of the partially finished impeller blades 38 and 39, respectively, to form the tips by which these blades are flared for reception in the correspondingly flared bore 16 of the extruding machine.

The additional impeller blades 50 and 51 may be forged, welded in position midway between the blades 38 and 39, in the manner already described and ground to finish.

In the operation of the feed screw impeller unit 10, the material such as rubber stock with or without added compounding agents is advanced by the feed screw 13 as two helical streams of equal dimensions by the two full threads 30 and 31. As each of these streams moves into the field of operation of the corresponding blade extension 52, it is subdivided thereby into two smaller streams of equal dimensions. The material therefore is distributed into four equal streams in the impeller 15 and advanced thereby towards and through the perforated partition device 12. Due to the continuous streamlining of the active surfaces of the feed device 10 in the section of said device between the feed screw 13 and the impeller 15 and in the impeller itself, the transition of the material from the field of action of said feed screw to the field of action of said impeller and the passage of said material along said impeller to the perforated partition device 12 are attended with minimum of uncontrollable agitation and minimum of flow resistance. This provides better performance control and increased production.

Figure 6:
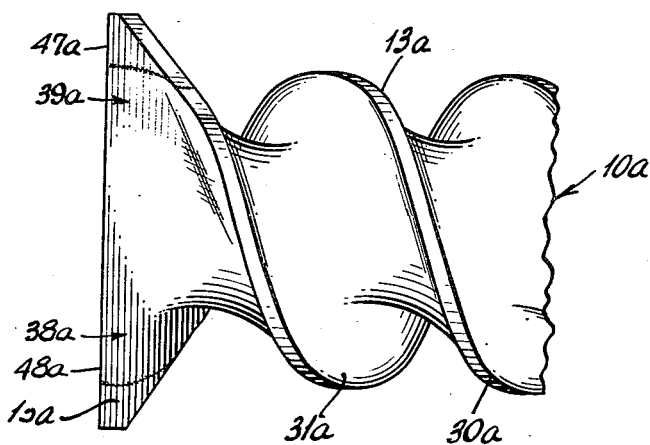
Fig. 6 is a side elevation of the feed screw impeller unit shown in Fig. 5.

There are certain situations where a two blade impeller is sufficient, in which case the feed device 10a may be constructed as shown in Figs. 5 and 6. This feed device 10a comprises a feed screw 13a similar to the feed screw 13 in Figs. 1–4 and similarly provided with two parallel threads 30a and 31a. The impeller 15a is similar to the impeller 15 except for the absence of the two added blades. The impeller 15a accordingly has only two blades 38a and 39a similar to the blades 38 and 39 in the construction of Figs. 1–4 and similarly forming integral streamline extensions of the screw threads 30a and 31a respectively. These blades 38a and 39a and the hub are graded as in the construction of Figs. 1–4 to terminate in the axially turned cutting edges 47a and 48a.

As far as certain aspects of the invention are concerned, the feed screw need not be of the double thread type but may be single-threaded. In that case, the impeller may have one blade welded to the screw thread to form a continuation thereof and an additional similar blade extending into the feed screw and connected thereto to define a partial thread for said feed screw, as in the form of the invention shown in Figs. 1–4.

Also, as far as certain aspects of the invention are concerned, instead of a two-threadfeed screw being integral with a two-blade impeller, the feed screw may have any number of threads, and the blade impeller any corresponding number of blades forming integral extensions of said threads respectively.

While the invention has been described with particular reference to specific embodiments, it is to be understood that it is not to be limited thereto but is to be construed broadly and restricted solely by the scope of the appended claims.

What is claimed is:

1. An impeller for continuously receiving plastic material from a feed screw, forcing it through a perforated partition and cutting it at said partition, said impeller comprising a hub tapering toward its delivery end and a blade integral with said tapered hub, said blade at its inner end being of helical shape corresponding to that of a feed screw thread and at its outer end being in the shape of a radial cutting edge extending substantially from the axis of the impeller to the periphery thereof, the inner end of the blade, the tapered hub and the outer end of the blade merging mutually into one another with streamline continuity and forming an uninterrupted helical material advancing pressure surface increasing progressively in area toward the delivery end of the impeller.

2. An impeller as defined in claim 1, characterized by a pair of such blades spaced 180° apart with their radial cutting edges in radial alignment and lying in the same transverse plane and thus extending across substantially the entire cutting face of the impeller.

3. An impeller as defined in claim 2, characterized by a second pair of such blades spaced 180° apart with reference to each other and at 90° with reference to the blades of the first pair, with their four radial cutting edges lying in the same plane and of substantially the same radial length.

4. An impeller as defined in claim 1, characterized in that the outer end of the impeller blade has an external diameter substantially greater than that of its inner end, whereby the radius of the radial cutting edge is correspondingly increased as well as the area of the material advancing pressure surface.

5. An impeller as defined in claim 1, characterized in that the outer end of the impeller blade extends axially outward in forming the radial cutting edge, locating said edge in a plane substantially at right angles to the axis of the impeller and forming flanking sides substantially at right angles to said plane.

6. An impeller as defined in claim 1, in combination with a feed screw having a hub and a helical thread, said impeller at its inner end being integral with the outer end of the feed screw, the impeller hub merging with and forming an uninterrupted continuation of the screw hub, and the impeller blade merging with and forming an uninterrupted continuation of the helical screw thread.

7. A device for feeding plastic material towards and through a perforated partition and cutting it at said partition, said device comprising a feed screw having a hub and at least one helical thread extending throughout its length, said thread terminating at its discharge end in the shape of a radial cutting edge extending substantially from the axis of the screw to the periphery thereof, the terminal portion of the screw hub being tapered and the terminal portion of the screw thread being shaped to form said radial cutting edge and merging with streamline continuity with each other and with the helical part of the screw thread and forming an uninterrupted helical material advancing pressure surface from one end of the screw to the other, said surface increasing progressively in area along the terminal portion of the screw toward its discharge end.

8. A device as defined in claim 7, characterized in that the terminal portion of the screw thread is flared outwardly, forming a radial cutting edge of substantially greater radius than that of the main portion of the screw thread and a material advancing pressure surface of correspondingly increased area in the flared zone of the screw.

9. A device as defined in claim 7, characterized by a partial screw thread extending along the terminal portion of the screw hub in spaced relation to the main screw thread, said partial screw thread having its inner end of helical shape and its outer end in the shape of a radial cutting edge extending substantially from the axis of the screw to the periphery thereof and lying in the same plane with the radial cutting edge of the main screw thread, the inner end of said partial thread, the tapered hub and the outer end of the partial thread merging mutually into one another in streamline continuity and forming a supplemental uninterrupted helical material advancing pressure surface increasing progressively in area toward the discharge end of the screw.

10. A device as defined in claim 9, characterized in that the terminal portions of the main screw thread and the partial screw thread are flared outwardly in the same manner and to the same extent, forming radial cutting edges of substantially greater radius than that of the main portion of the main thread and material advancing pressure surfaces of correspondingly increased area in the flared zone.

11. In a machine for extruding plastic material, the combination of a chamber forming a passage for the material, a perforated partition extending across the discharge end of the chamber, and a feed screw for feeding the material along said chamber and through the perforated partition, said screw having a hub with at least one helical thread extending throughout the length of the chamber and terminating at its delivery end in the shape of a radial cutting edge, said cutting edge extending substantially from the axis of the screw to the periphery thereof and arranged in close proximity to the perforated partition, the terminal portion of the screw hub being tapered and the terminal portion of the screw thread being shaped to form said radial cutting edge and merging with streamline continuity with each other and with the helical part of the screw thread and forming an uninterrupted helical material advancing pressure surface from one end of the screw to the other, said surface increasing progressively in area along the terminal portion of the screw toward the perforated partition.

12. In a machine for extruding plastic material, the combination of a chamber forming a passage for the material and comprising a long cylindrical section of a given diameter and a short end section of substantially greater diameter, a perforated partition extending across the discharge end of the expanded end section, and a feed screw for feeding the material along the two sections of the chamber and through the perforated partition, said feed screw comprising a main portion fitted within the cylindrical section of the chamber and an enlarged head portion fitted within the expanded end section of the chamber, said screw having at least one helical thread extending continuously throughout the length of both its main and head portions and forming an uninterrupted helical material advancing pressure surface from one end of the screw to the other, said surface along the head portion of the screw increasing progressively in area toward the perforated partition.

JAMES C. CLINEFELTER.

REFERENCES CITED

The following references are of record in the file of this patent:

UNITED STATES PATENTS

| Number | Name | Date |
| --- | --- | --- |
| 300,278 | Nolan | June 10, 1884 |
| 916,827 | Bangs | Mar. 30, 1909 |
| 1,987,359 | Brown | Jan. 8, 1935 |
| 2,011,055 | Klugh | Aug. 13, 1935 |
| 2,291,212 | Clinefelter | Aug. 28, 1942 |